United States Patent Office 3,244,637
Patented Apr. 5, 1966

3,244,637
LIQUID SCINTILLATOR COMPOSITION CONTAINING ARYL ALKARYL LEAD COMPOUNDS
Kwan C. Tsou, Huntingdon Valley, and Stanley R. Sandler, Philadelphia, Pa., assignors to The Borden Company, New York, N.Y., a corporation of New Jersey
No Drawing. Filed Oct. 1, 1962, Ser. No. 227,599
4 Claims. (Cl. 252—301.2)

This invention relates to scintillators and particularly to new primary absorbers for use therein.

The scintillators are useful in detecting and measuring nuclear ionizing radiations such as beta and gamma.

Scintillators of this class ordinarily include three classes of materials as follows: a primary absorber which absorbs the ionizing radiation and converts a part of it to useful molecular excitation energy; the primary fluor which receives the energy from said absorber and transfers it to the wavelength shifter; and a wavelength shifter which converts the energy so received to the wavelength desired for final measurement. Our invention is particularly useful in making a desirable liquid scintillator.

The effectiveness of a scintillator in converting a fixed quantity of ionizing radiation to visible light is measured by well known nuclear counting devices and is expressed as a voltage pulse height which is directly related to the amount of visible light received from said scintillator.

The art shows various alkyl lead compounds as the primary absorbers in the scintillator compositions. When the alkyl component is replaced by an aromatic, as in the compounds tetraphenyl or tetratolyl lead, the compound becomes only very silghtly soluble in volatile solvents such as commonly used in liquid scintillators. The triphenyl monoalkyl substituted phenyl lead compounds, on the other hand, are many times as soluble as shown in the table below which gives the data for room temperature.

| Material: | Solubility, g./100 g. toluol |
|---|---|
| Tetraphenyl lead | 2.0. |
| Tetratolyl lead | 3.0. |
| Triphenyl 4-ethylphenyl lead | Greater than 100. |

In general it is known that lead compounds are quenchers.

We have found, however, a very striking reversal of effect when the triphenyl 4-ethylphenyl lead is used as the absorber in the scintillator compositions, in varying proportions made possible by its solubility. When this material is added in small amounts to a scintillator solution containing a standard primary fluor and wavelength shifter, the effect of the triphenyl 4-ethylphenyl lead is the expected quenching of the effectiveness of the scintillator as compared to the pulse height given by anthracene crystal. When, on the other hand, the proportion of the triphenyl 4-ethylphenyl lead is increased above a certain level, then this effect is reversed and the scintillator composition gives abnormally high pulse heights.

The invention comprises the herein described triaryl monoalkylaryl lead compounds and scintillator compositions for detecting beta and specifically gamma radiation that contain said lead compounds as primary absorbs. In the preferred embodiment, the invention comprises triphenyl 4-ethylphenyl lead.

The primary absorber is of the general formula $$R_xPb(R'C_nH_{2n+1})_{4-x}$$

in which R is an aryl, e.g., phenyl, tolyl or xylyl; R' is a bivalent component selected from the group consisting of phenylene, tolylene, and xylylene; $n$ is an integer in the range 1–3, and $x$ is 2 or 3 and usually 3.

With our primary absorber we use any of the conventional primary fluors including those shown in Table I.

Table I.—Primary Fluors p-Terphenyl (PTP)
m-Terphenyl
Trans-stilbene
Anthracene
2-phenyl-5-(4-biphenyl)-1,3,4-oxidiazole (PBD)
2,5-diphenyloxazole
p,p'-Quaterphenyl
1,1,4,4-tetraphenyl-1,3-butadiene
Naphthalene
2,5-di-(4-biphenyl)-oxazole
2-(1-naphthyl)-5-phenyloxazole
1,3,5-triphenyl-2-pyrazoline
1,3-diphenyl-5-p-acetoamidophenyl-2-pyrazoline
1,3-diphenyl-5-p-hydroxyphenyl-2-pyrazoline
1-phenyl-3,5-di-p-methoxyphenyl-2-pyrazoline
1,3-diphenyl-5-p-methoxyphenyl-2-pyrazoline
1,3-diphenyl-5-p-biphenyl-2-pyrazoline
1,3-diphenyl-5-methyl-2-pyrazoline
1,5-diphenyl-2-p-methoxyphenyl-2-pyrazoline Wavelength shifters that we use are also any that are conventional including those of Table II.

Table II.—Wavelength Shifters 1,1,4,4-tetraphenyl-1,3-butadiene
1,4-di-[2-(5-phenyloxazolyl)]-benzene (POPOP)
Diphenyl stilbene
1,3,5-triaryl-2-pyrazolines (a primary fluor and a wave shifter)

When a material is both a primary fluor and a wavelength shifter, then our scintillator may consist of the primary absorber and the said material.

Proportions that we can use are shown in the following table, in which one column shows the permissible range and another the range recommended for commercial use.

| Component | Parts by weight for 100 of primary absorber | |
|---|---|---|
| | Permissible | Commercial |
| Primary fluor | From 0.05 to the limit of solubility in the primary absorber. | 1–5 |
| Wave length shifter | 0.005–1 | 0.1–1 |

Proportions of the primary fluor and wavelength shifter above the amounts shown for 100 parts of primary absorber are unnecessary in commercial use.

There is used ordinarily also a volatile liquid solvent which is clear, transparent, chemically inert to and a solvent for all of the materials of the several classes, namely the primary absorber, primary fluor, and wavelength shifter. Such volatile solvents that we may use are any aromatic or alkylaromatic hydrocarbon, examples of which are toluol, xylol, and liquid alkyl substituted benzenes having 1–12 carbon atoms in the alkyl component, e.g., ethyl, propyl, and butyl, any diethyl benzene and mono-, di-, and trihalogenobenzene, the halogen being chlorine or fluorine.

The proportion of our primary absorber to the volatile solvent used may be any amount above that which increases the pulse height up to the saturation proportion at the lowest temperature to which the liquid scintillator composition will be exposed during shipment, storage or use. For most effective results, proportions should be high and the primary absorber may be dissolved in the usual volatile aromatic hydrocarbons or like solvents in such amounts as about 10–120 parts for 100 parts of the solvent.

The effect of proportion of the primary absorber in a liquid scintillator composition with the primary fluor PTP and wavelength shifter POPOP in fixed amounts of 0.5%–0.05%, respectively, all percentages being on the total weight of the composition, is shown in the following table, the solvent being toluol. Here as elsewhere herein all proportions are expressed as parts by weight except where specifically stated to the contrary.

| Concentration in total solution, percent | | | Relative gamma pulse height |
| --- | --- | --- | --- |
| PTP | POPOP | Triphenyl 4-ethylphenyl lead | |
| 0.5 | 0.05 | 0 | 100 |
| 0.5 | 0.05 | *1 | 58 |
| 0.5 | 0.05 | *3 | 85 |
| 0.5 | 0.05 | *6 | 91 |
| 0.5 | 0.05 | 10 | 120 |
| 0.5 | 0.05 | 20 | 157 |
| 0.5 | 0.05 | 50 | 160 |
| Anthracene crystal for comparison | | | 155 |
| Competitive lead absorber (5% actual lead) | | | 66 |

*Note quenching effect at these concentrations.

Since the triphenyl 4-ethylphenyl lead contains approximately 38% of lead, the 50% concentration of the organic lead compound provides about 19% of actual lead. By contrast the "competitive" organic lead compound "NE–314" currently used in such compositions, at or near the maximum or saturation concentration, provides only about 5% of actual lead and gives a pulse height of 66.

It is noted that anthracene, shown for comparison only, is a solid and is not available in liquid compositions which approach the pulse height with our product.

The relative pulse heights which measure the effectiveness of the scintillator were determined with a scintillation counter, 1.94 microcuries of $Co^{57}$ gamma radiation source, 6199 RCA photomultiplier tube, and usual accessories.

The preparation of the lead aryls is illustrated first by description in connection with making triphenyl 4-ethylphenyl lead.

This is prepared by mixing 0.1 mole of 4-ethylphenyl magnesium bromide and 0.05 mole of triphenyl lead chloride in ether, stirring until the reactants are dissolved and maintaining the temperature below the boiling point of the solution until substantially no more magnesium bromide precipitates. This reaction mixture is hydrolyzed with cold aqueous ammonium chloride and the organic layer is separated and warmed to expel the ether. The residue is then crystallized from a solution in hot methanol or isopropanol by cooling, to give white crystals of melting point 82°–84° C.

The corresponding tolyl and xylyl derivatives of lead for use herein are prepared exactly as described except that the alkylaryl magnesium bromide and the triaryl lead chloride used contain the particular alkylaryl and aryl groups that are to appear in the lead compound to be made. Thus we react 4-ethyltolyl magnesium bromide with tritolyl lead chloride or react 4-ethylxylyl magnesium bromide with trixylyl lead chloride, the molar proportions being 0.1 and 0.05, respectively, for the two reactants in each preparation.

To make the diaryl dialkylaryl lead, the said two reactants are used in approximately equimolar proportions.

The invention will be further illustrated by description in connection with the following specific examples, proportions here and elsewhere herein being expressed as parts by weight unless specifically stated to the contrary.

*Example 1*

A liquid scintillator composition is made of the following formula.

| Component: | Parts by weight |
| --- | --- |
| Triphenyl 4-ethylphenyl lead (primary absorber) | 20 |
| p-Terphenyl (PTP, primary fluor) | 0.5 |
| 1,4-di[2-(5-phenyloxazolyl)]-benzene (POPOP, wavelength shifter) | 0.05 |
| Toluol (volatile solvent) | 79.45 |
| Total | 100.00 |

The components were stirred in the toluol until solution was complete. The solution, when used as the scintillator composition for determining the intensity of radiation gamma rays, showed a relative pulse height of 157 as compared to 155 for anthracene in crystal form under the same conditions.

*Example 2*

The procedure and composition of Example 1 are followed exactly except that the triphenyl 4-ethylphenyl lead there used is replaced by an equal weight of tritolyl 4-ethyltolyl lead and, separately, by an equal weight of trixylyl 4-ethylxylyl lead.

*Example 3*

The procedure and compositon of Example 1 are used except that the primary fluor (p-terphenyl) is replaced by an equal weight of any one of the other compounds shown in Table 1 above.

*Example 4*

The procedure and composition of Example 1 are used except that the POPOP used as wavelength shifter therein is replaced by an equal weight of any of the other compounds shown in Table II above.

The scintillator composition made as described are satisfactory in determining the intensity of beta and more particularly gamma radiations incident thereupon, with the apparatus and under the conditions described.

*Example 5*

The procedure and composition of Example 1 are used except that the triphenyl 4-ethylphenyl lead is replaced by an equal weight of diphenyl diethylphenyl lead, in any isomeric form thereof.

It will be understood that it is intended to cover all changes and modifications of the examples of the invention herein chosen for the purpose of illustration which do not constitute departures from the spirit and scope of the invention.

We claim:

1. A liquid scintillator composition consisting essentially of:
   (1) an aryl alkaryl lead primary absorber of the formula

in which R is an aryl selected from the class consisting of phenyl, tolyl and xylyl groups, R' is a bivalent component selected from the group consisting of phenylene, tolylene, and xylyene, and $n$ and $x$ are integers in the range 1–3 and 2–3 respectively, said absorber being present in proportion of 100 parts by weight;

(2) a primary fluor selected from the compounds shown in Table I above, in proportion of at least 0.05 part by weight;

(3) a wavelength shifter selected from the compounds shown in Table II above, in proportion of between 0.005–1 part by weight, and:

(4) a volatile solvent, the solvent being a transparent liquid chemically inert to the other components and serving to form a solution thereof, the proportion of said solvent being such that there is present in said composition at least 10 parts by weight of said primary absorber for 100 parts by weight of solvent.

2. The scintillator composition of claim 1, the volatile solvent being toluol.

3. The scintillator composition of claim 1, the proportions by weight being about 10–50 parts of the primary absorber, 1–5 of the primary fluor, 0.1–1 of the wavelength shifter and an amount of the volatile solvent to make the total weight 100 parts.

4. A scintillator comprising approximately 10–50 parts of triphenyl 4-ethylphenyl lead as primary absorber, 1–5 parts of p-terphenyl as primary fluor, 0.1–1 part of 1,4-di-2-(5-phenyloxazolyl)-benzene as wavelength shifter, and toluol as inert solvent in amount to make 100 parts total weight of the resulting solution.

References Cited by the Examiner

UNITED STATES PATENTS

| | | | |
|---|---|---|---|
| 2,720,505 | 10/1955 | Caldwell et al. | 160—437 X |
| 2,859,232 | 11/1958 | Blitzer et al. | 260—437 |
| 2,989,558 | 6/1961 | Blitzer et al. | 260—437 |
| 3,010,908 | 11/1961 | Broderick et al. | 252—301.2 |
| 3,041,287 | 6/1962 | Hyman | 252—301.2 |
| 3,068,178 | 12/1962 | Kallman et al | 252—301.2 |

TOBIAS E. LEVOW, *Primary Examiner.*

JULIUS GREENWALD, MAURICE A. BRINDISI,
*Examiners.*

R. D. LOVERING, R. D. EDMONDS,
*Assistant Examiners.*